United States Patent [19]

Doane et al.

[11] Patent Number: 4,994,204
[45] Date of Patent: Feb. 19, 1991

[54] LIGHT MODULATING MATERIALS COMPRISING A LIQUID CRYSTAL PHASE DISPERSED IN A BIREFRINGENT POLYMERIC PHASE

[75] Inventors: Joseph W. Doane, Kent; John L. West, Munroe Falls, both of Ohio

[73] Assignee: Kent State University, Kent, Ohio

[21] Appl. No.: 324,051

[22] Filed: Mar. 20, 1989

Related U.S. Application Data

[63] Continuation-in-part of Ser. No. 267,232, Nov. 4, 1988, which is a continuation-in-part of Ser. No. 180,215, Apr. 11, 1988, abandoned.

[51] Int. Cl.$^5$ .............................................. C09K 19/52
[52] U.S. Cl. ...................... 252/299.01; 252/299.5; 428/1; 350/334; 350/347 E; 350/348; 350/347 R
[58] Field of Search ............ 428/1; 252/299.01, 299.5; 350/334, 347 E, 348, 347 R

[56] References Cited

U.S. PATENT DOCUMENTS

| | | | |
|---|---|---|---|
| 2,953,819 | 9/1960 | Hoboubek et al. | 18/58 |
| 3,585,381 | 6/1971 | Hodson et al. | 250/47 |
| 3,600,060 | 8/1971 | Churchill et al. | 350/160 |
| 3,620,889 | 11/1971 | Baltzer | 161/5 |

(List continue on next page.)

FOREIGN PATENT DOCUMENTS

| | | | |
|---|---|---|---|
| 156615 | 11/1985 | European Pat. Off. | 350/347 V |
| 2139537 | 1/1973 | France | 350/347 V |
| 5596922 | 7/1980 | Japan | 252/299.5 |
| 63-243165 | 11/1988 | Japan | 252/299.01 |
| 86/01927 | 3/1987 | PCT Int'l Appl. | 350/347 V |
| 1442360 | 7/1976 | United Kingdom | 252/299.5 |
| 85/00397 | 9/1985 | World Int. Prop. O. | 350/347 V |

OTHER PUBLICATIONS

Drzaic, "Polymer Dispersed Nematic Liquid Crystal for Large Area Displays and Light Valves", 60 J. Appl. Phys. 2142 (9/15/86).
Craighead, H. G. et al., Appl. Phys. Lett., 40 (1), 1982, p. 23.
Finkleman, H., "Polymer Liquid Crystals", Academic Press, 1982.
Finkleman, H. et al., Mol Cryst. Liq. Cryst., 89, 23, 1982.
Engel, M. et al., Pune & Appl. Chem. 57(7) 1009 1985.
Ringsdorf H. et al., Makromol Chem. Rapid Comm. 3, 745, 1982.
Sigaud, G. et al., Macromolecules 20, 578, 1987.
West, J. L., Mol Cryst. Liq. Cryst. 157, 427, 1988.
Amano, M. et al., Mol. Cryst. Liq. Cryst. 164, 77, 1988.

Primary Examiner—John S. Maples
Assistant Examiner—Richard Treanor
Attorney, Agent, or Firm—Watts, Hoffmann, Fisher & Heinke Co.

[57] ABSTRACT

A haze-free light modulating polymer dispersed liquid crystal (PDLC) material is disclosed which comprises a polymer matrix which is birefringent and possesses anisotropic optical properties similar to those of the dispersed liquid crystal microdroplets such that the PDLC material in its transparent state exhibits a refractive index that is matched for all directions of incident light providing for an optically clear, scatter-free film for all angles of view. Electrooptic light shutters are possible from this material which are transparent in the field OFF-state and opaque in the field ON-state or vice versa, depending upon the microdroplet structure and configuration of the light shutter device.

17 Claims, 3 Drawing Sheets

U.S. PATENT DOCUMENTS

| | | | |
|---|---|---|---|
| 3,795,529 | 5/1974 | Cartmell et al. | 428/1 |
| 3,816,786 | 6/1974 | Churchill et al. | 428/1 |
| 3,852,092 | 12/1974 | Patterson et al. | 252/299.01 X |
| 3,872,050 | 3/1975 | Benton et al. | 260/37 N |
| 3,885,982 | 5/1975 | Fergason | 252/299.5 X |
| 3,935,337 | 1/1976 | Taylor | 427/180 |
| 3,969,264 | 7/1976 | Davis | 252/299.01 |
| 4,022,706 | 5/1977 | Davis | 252/299.01 |
| 4,048,358 | 9/1977 | Shanks | 428/1 |
| 4,070,912 | 1/1978 | McNaughtan | 252/299.01 |
| 4,101,207 | 7/1978 | Taylor | 350/344 |
| 4,161,557 | 7/1979 | Suzuki et al. | 428/1 |
| 4,228,029 | 10/1980 | Osman | 252/299 |
| 4,293,193 | 10/1981 | Labes et al. | 350/350 R |
| 4,310,577 | 1/1982 | Davison et al. | 252/299.5 |
| 4,435,047 | 3/1984 | Fergason | 350/334 |
| 4,596,445 | 6/1986 | Fergason | 350/339 F |
| 4,601,545 | 7/1986 | Kern | 350/347 X |
| 4,617,371 | 10/1986 | Blunstein et al. | 252/299.01 X |
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |
| 4,702,558 | 10/1987 | Coles et al. | 252/299.01 |
| 4,728,547 | 3/1987 | Vaz et al. | 428/1 |
| 4,757,130 | 7/1988 | DeMartino | 528/288 |
| 4,850,683 | 7/1989 | Kawaguchi et al. | 350/350 R |
| 4,869,847 | 9/1989 | Leslie et al. | 252/299.01 |
| 4,890,902 | 1/1990 | Doane et al. | 350/347 V |
| 4,891,152 | 1/1990 | Miller et al. | 252/299.01 |

LIGHT MODULATING MATERIALS COMPRISING A LIQUID CRYSTAL PHASE DISPERSED IN A BIREFRINGENT POLYMERIC PHASE

RELATED APPLICATIONS

This application is a continuation-in-part of application Ser. No. 267,232, filed Nov. 4, 1988, which is a continuation-in-part of application Ser. No. 180,215, filed Apr. 11, 1988, now abandoned.

BACKGROUND OF THE INVENTION

1. Technical Field

This invention relates to liquid crystal light modulating materials and, more particularly, to light modulating materials comprising liquid crystal microdroplets dispersed in a birefringent, light transmissive synthetic resin matrix.

2. Description of the Related Art

The advantages associated with light modulating materials prepared as phase-separated dispersions of liquid crystal microdroplets in light transmissive, synthetic resins matrices are discussed in U.S. Pat. Nos. 4,671,618; 4,673,255; 4,685,771; and 4,688,900, the disclosures of which are incorporated by reference. Such materials are referred to as polymer dispersed liquid crystal (PDLC) materials.

The method of phase separation can be carried out by polymerization (PIPS), thermal induction (TIPS), or solvent evaporation (SIPS). As disclosed in U.S. Pat. Nos. 4,685,771 and 4,688,900, epoxy resins are useful in these techniques. For PIPS, a matrix-providing composition containing liquid crystal and uncured epoxy is polymerized by the addition of a curing agent, e.g., a fatty amine, or by ultraviolet light, to yield microdroplets of liquid crystal in a thermoset polymeric epoxy resin. For TIPS, a matrix-providing composition containing liquid crystal and epoxy resin modified by curing with a non-cross-linking curing agent, such as monoalkylamine, so as to exhibit thermoplastic behavior, is heated and then cooled to yield microdroplets of liquid crystal in a thermoplastic polymeric epoxy resin.

Electrically addressable, light modulating materials prepared by phase separation techniques have employed liquid crystals exhibiting positive dielectric anisotropy. Such materials are opaque to incident light in the absence of an applied electric field and are transmissive to incident light in the presence of a field.

Mechanical entrapment techniques have been used to fabricate devices employing liquid crystals exhibiting both positive dielectric anisotropy (U.S. Pat. No. 4,435,047) and negative dielectric anisotropy (French Patent No. 2,139,537). Devices employing negative dielectric anisotropic liquid crystals are fairly transparent in the OFF-state and increase opacity as a function of applied voltage in the ON-state.

The various techniques of preparing light modulating materials having microdroplets of liquid crystal in a light transmissive resin matrix can be accompanied by techniques of matching and mismatching the effective index of refraction of the microdroplets to the index of refraction of the matrix in order to achieve a desired viewing angle in which displays, windows, etc. incorporating such materials may be made viewable or clear. For example, in the case of PDLC materials made with liquid crystal exhibiting positive dielectric anisotrophy, the ordinary index of refraction typically is matched to the refractive index of the matrix so that in a field-ON state the display or window appears visible or clear because the optical axes of refraction of the microdroplets are aligned parallel to the field and normal to the viewing surface. In the field-OFF state, the optical axes are misaligned or randomly oriented so that incident light is scattered and the display or window appears opaque.

In windows or displays as described above in which the ordinary index of refraction of the liquid crystal is matched to the refractive index of the matrix, the device appears most transparent (field-ON state) when viewed directly in the direction of the field which is usually normal to the viewing surface. Transparency decreases giving rise to increasing "haze" at increasing oblique angles until an essentially opaque appearance is detected at an oblique enough angle. This condition of haze results from the fact that the further the viewing angle is from the orthogonal, the greater is the perceived mismatch between the extraordinary indices of refraction of the liquid crystal microdroplets and the refractive index of the matrix.

It has now been discovered that it is possible to produce liquid crystal, light modulating material of the type described which is essentially haze-free and transparent at all viewing angles. This is accomplished by using a birefringent material as the matrix and matching the ordinary and extraordinary indices of refraction of the microdroplets to the ordinary and extraordinary indices of refraction of the matrix. When the optical axes of the microdroplets and the matrix are aligned or parallel, the material is transparent and there is no perceived mismatch of the indices regardless of the angle of view. The hazefree viewing angle is ±90° from the perpendicular to the viewing surface. Because of surface reflections, such as may occur at the inner and outer surfaces of the substrates, the actual full field of view may be about ±60°.

The new material can operate in the usual manner so that it is transparent in a field-ON state and opaque in a field-OFF state. Alternatively, it has been discovered that the new material can be made to operate in a reverse or "fail-safe" mode such that the material is transparent in the absence of a field and is opaque in a field-ON state.

DISCLOSURE OF THE INVENTION

The invention generally comprises a light modulating liquid crystal device incorporating a new PDLC material comprising microdroplets of liquid crystal dispersed in a birefringent, light transmissive matrix, the effective indices of refraction of the microdroplets and the matrix being matched for all directions of incident light so that the device is transparent and haze-free in one of a field-ON state or a field-OFF state, and the effective indices of refraction are mismatched so that the device is opaque in the other of the field-ON state or field-OFF state. In one particular embodiment of the invention to be described, either the liquid crystal of the microdroplets or the matrix is a liquid crystal polymer.

One embodiment of the invention more particularly comprises a light modulating liquid crystal device incorporating a material comprising microdroplets of low molecular weight liquid crystal dispersed in a light transmissive, liquid crystal polymeric matrix having its optical axis aligned relative to a surface of the material, the ordinary and the extraordinary indices of refraction of the liquid crystal microdroplets being respectively matched to the ordinary and extraordinary indices of refraction of the matrix, so that the material is transparent and haze-free for all directions of incident light when the optical axes of the microdroplets are aligned parallel to the optical axis of the matrix, and so that the material is opaque when the effective indices of refraction of the microdroplets and matrix are mismatched. An especially preferred matrix is a liquid-crystal-side-group polymer.

According to another aspect of the invention, there is provided a method of making a light modulating liquid crystal material having the characteristic of displaying haze-free transparency for all directions of incident light comprising the steps of forming phased dispersed liquid crystal microdroplets in a birefringent, light transmissive polymeric matrix, the microdroplets and matrix having matched ordinary and extraordinary indices of refraction, and aligning the optical axis of the matrix relative to a viewing surface of the material, whereby haze-free transparency is obtained by aligning the optical axis of the microdroplets parallel to the optical axis of the matrix, and the material is rendered opaque by mismatching the effective refractive indices of the microdroplets and matrix. In one preferred embodiment, the method is carried out by forming phased dispersed, low molecular weight liquid crystal droplets in a liquid crystal polymeric matrix wherein the mesogenic units have positive dielectric anisotropy, the liquid crystal of the droplets and the matrix being selected to have matching ordinary and extraordinary indices of refraction.

As recognized by those in the art, the extraordinary index of refraction, $n_e$ of uniaxial liquid crystal is observed for a linearly polarized light wave where the electric vector is parallel to the optical axis. Thus, the optical axes of the birefringent matrix and the liquid crystal microdroplets of the new PDLC material will be understood to lie in the same directions associated with the respective extraordinary indices of refraction. It will also be understood that the direction associated with the ordinary indices of refraction of the birefringent matrix and the microdroplets is established by the electric vector vibrating perpendicular to the respective optical axes.

Polymeric liquid crystals are known in the art. Polymeric liquid crystals or liquid crystalline polymers are unions of mesogenic units and polymer main chain. The mesogenic units and the polymer main chain may be combined in two ways to form two types of liquid crystalline polymers—those where the mesogenic unit is contained in the main chain of the polymer and those wherein the mesogenic unit is attached as a pendant (side-chain) from the polymer main chain. The general synthesis, structure and properties of liquid crystalline polymers are discussed in 57 *Pure & Appl. Chem.*, 1009 (1985) and in *Polymer Liquid Crystals*, Academic Press, Inc., 1982.

The present invention contemplates either main chain or side chain polymers for the microdroplets or the matrix. The preferred liquid crystal is a side chain polymer, since the side chain mesogenic units are more easily alignable in a field than main chain units. The new PDLC materials of the invention incorporating the preferred liquid-crystal-line-side-group polymeric matrix are generally characterized by haze-free full field of view (no angular dependence), an optional reverse or "fail-safe" mode of operation, and improved electrical responses requiring a lower driving voltage, as compared to previous PDLC material.

The preferred liquid crystal polymeric matrix may be made from any suitable synthetic prepolymer cured by a mesogenic curing agent, or it may be made from an uncured resin having mesogenic units cured by a suitable curing agent for the resin. For example, a liquid-crystal-side-chain PDLC material is made by PIPS by mixing liquid crystal with the mesogenic curing agent and uncured synthetic resin and thereafter curing to induce polymerization of the matrix with concomitant microdroplet formation. Liquid-crystal-side-chain PDLC materials are fabricated by PIPS by mixing liquid crystal with curing agent and uncured synthetic resin having a mesogenic side chain, and thereafter curing to induce polymerization of the matrix with concomitant microdroplet formation. Liquid-crystal-side-chain PDLC materials may be fabricated by TIPS by warming a mixture of liquid crystal and polymerized synthetic resin having liquid-crystal-side-chains to a temperature at which the resin and liquid crystal form a homogeneous solution and thereafter cooling the solution to induce microdroplet formation. Liquid-crystal-side-chain PDLC materials may also be fabricated by the SIPS technique by withdrawing solvent from a solution of liquid crystal and resin having mesogenic units to induce droplet formation.

A preferred matrix comprises a liquid-crystal-side-group synthetic polymer of the modified thermoplastic type, such as the epoxies, or poly(vinyl butyral), poly (vinyl acetate), poly(vinyl formal), polycarbonate, poly(vinyl methyl ketone), poly(methyl acrylate), poly(cyclohexyl methacrylate), poly(isobutyl methacrylate) and poly(methyl methacrylate) and equivalents thereof. The liquid-crystal-side-group preferably comprises a cyanobiphenyl. The cyanobiphenyl moiety is preferably spaced from the polymer main chain by a flexible alkyl spacer of sufficient length to allow the mesogenic moieties to align in a common direction. An example of a suitable mesogenic curing agent is a cyanobiphenyl alkoxy amine.

The mesogenic units of the liquid crystal polymeric matrix can be aligned in different ways. When the mesogenic units have positive anisotropy, an ac or magnetic field will cause the optical axes to be aligned parallel to the field, i.e., in a direction which usually is normal to the viewing surface. This alignment can be made to persist after the field is removed by cross-linking the polymeric matrix, by operating the material below the glass transition temperature, or by surface treatment of the glass substrates which contain the material.

When the device described above goes from the transparent state to the opaque state, the effective refractive index of the microdroplets change. This can happen in several different ways. One is a change in the director configuration, for example to, a radial-type structure, that alters the value of the microdoplets' effective refractive index. Various types of droplet director configurations have been described in the literature. It will be understood that the director configuration of the droplets in the OFF-state can depend upon the droplet size, the elastic properties of the liquid crystal, and the surface conditions imposed by the polymer. Another mechanism to change the refractive index of the droplets is a change in the orientation of the optical axes of the droplets imposed by a non-spherical shape or by surface anchoring conditions at the droplet wall. Non-spherical droplets with random orientations can sometimes occur during the phase separation process and can provide a random orientation of the optical axes of the droplets in the absence of a field. Such conditions change the effective refractive index of the droplets relative to that of the polymer matrix and render the material opaque in the field-OFF state.

A light modulating device, such as a window or light shutter, etc., incorporating the new haze-free PDLC material of the present invention can be made to operate in the usual way so that it is opaque in a field-OFF state and transparent or light transmissive in a field-ON state. This is accomplished by making the material so that the optical axis of the birefringent matrix is oriented normal to the viewing surface of the material. In the ON-state, an ac field aligns the optical axes of the liquid crystal microdroplets which also have positive dielectric anisotropy, parallel with the optical axis of the matrix, i.e. normal to the viewing surface. Since the ordinary and extraordinary indices of the microdroplets and the matrix are matched, the material is haze-free for all directions of incident light in the ON-state. In the OFF-state, the director configuration of the microdroplets is changed so that the effective refractive index of the microdroplets is mismatched with respect to the effective refractive index of the matrix for all directions of incident light, whereby incident light is scattered and the material is opaque.

The new PDLC material of the invention also can be made to operate in a reverse or fail-safe mode such that the material is transparent in the OFF-state and opaque in the ON-state. In one embodiment of the new reverse mode operating material, liquid crystal microdroplets are phase dispersed in a birefringent, light transmissive matrix, preferably, a liquid crystal polymeric matrix, by any of the techniques described above. As in other embodiments of the invention, the ordinary and extraordinary indices of refraction of the microdroplets are respectively matched to those of the matrix. After the material has been made, oppositely directed shear forces are applied to align the optical axis of the matrix obliquely to the viewing surface. The shear stress also serves to elongate the microdroplets and align their optical axes parallel to the optical axis of the matrix. The effective refractive indices of the microdroplets and matrix are thus matched so that in the OFF-state the material is transparent and haze-free for all directions of incident light. When the material is incorporated into a light shutter device and a field is applied normal to the viewing surface, the microdroplets will align either parallel or perpendicular to the field depending upon whether the microdroplets have positive or negative anisotropy, respectively. In either situation, the field causes the effective refractive indices of the microdroplets to be mismatched with respect to the effective refractive index of the matrix so that the material is light scattering and opaque.

Another embodiment of a reverse or fail-safe mode operating material is made with liquid crystal microdroplets having a bipolar structure and negative dielectric anisotropy. The liquid crystal microdroplets are phase dispersed in a birefringent matrix, preferably a liquid crystal polymeric matrix wherein the mesogenic units have positive anisotropy. The optical axis of the matrix is aligned during its formation by application of an ac field. The bipolar liquid crystal microdroplets naturally align with the matrix so that the optical axes of the microdroplets and matrix are normal to the viewing surface of the material. Since the ordinary and extraordinary indices of refraction of the microdroplets are respectively matched to those of the matrix, the resulting material is transparent and haze-free for all directions of incident light in the OFF-state. In the ON-state, the negative dielectric anisotropic liquid crystal microdroplets respond to the electric field by aligning in a direction perpendicular to the field, thereby causing a mismatch in the indices of refraction between the matrix and the microdroplets for all angles of view. The reverse mode material using a low molecular weight liquid crystal exhibiting negative dielectric anisotropy for the microdroplet can be prepared by any of the SIPS, TIPS or PIPS methods of phase separation, and the liquid-crystal-side-groups of polymeric matrix aligned perpendicular to a viewing surface of the material by an ac field.

The low molecular weight liquid crystal employed in the full field of view PDLC material or device made according to the invention may be of the type that switches its dielectric anisotropy from positive to negative as a function of the frequency to which it is exposed. By way of example, this type of liquid crystal exhibits negative dielectric anisotropy at a high frequency and positive anisotropy at a low frequency. Similarly, the polymeric liquid crystal may be of the type that switches the sign of its dielectric anisotropy depending upon the value of frequency.

The use of a so-called cross-over frequency liquid crystal in the microdroplets allows for the fabrication of windows and devices with enhanced contrast and increased ease of alignment of the liquid crystal microdroplets with respect to the liquid-crystal-side-group of the matrix. This is because at a given frequency, the liquid crystal component of the matrix may be caused to align in one direction, while at the same frequency the liquid crystal component of the microdroplets may be caused to align in a direction perpendicular to the first.

Other features, advantages and a fuller understanding of the invention will become apparent to those skilled in the art from the following description of the best modes of the invention and the accompanying drawings.

BEST MODE FOR CARRYING OUT THE INVENTION

FIG. 1 illustrates how liquid crystal PDLC light modulating material of the present invention can be fabricated so that in the field ON state the material is transparent for all directions of incident light and, hence, haze-free as compared with PDLC materials prepared with the usual thermoset and thermoplastic synthetic resins which have isotropic optical properties. The field of view of the known PDLC materials made from isotropic polymers is limited by an unavoidable mismatch of indices of refraction at wide angles of view in the ON-state. This is because the extraordinary index of refraction of the liquid crystal usually is aligned normal to the surface of the material in order to achieve transparency in the ON-state. As the angle of view widens from the perpendicular, there is a greater perceived mismatch between the refractive index of the matrix and the extraordinary indices of refraction of the liquid crystal microdroplets. The full field of view of the PDLC materials of the invention which employ a birefringent, light transmissive matrix, such as a liquid crystal polymeric resin, is due to the fact that the matrix for the liquid crystal droplet is itself liquid crystalline possessing the same optical properties of the droplets so that the effective refractive index of the droplets can be matched to that of the matrix for all directions of incident light, whereby there is no light scattering in any direction or haze. The effective refractive indices of the matrix and microdroplets are matched for all directions of incident light when the ordinary and extraordinary refractive indices of the droplets are respectively matched to the ordinary and extraordinary refractive indices of the polymer matrix, and the optical axes of the droplets are aligned parallel to the optical axes of the matrix.

Figure 1A:
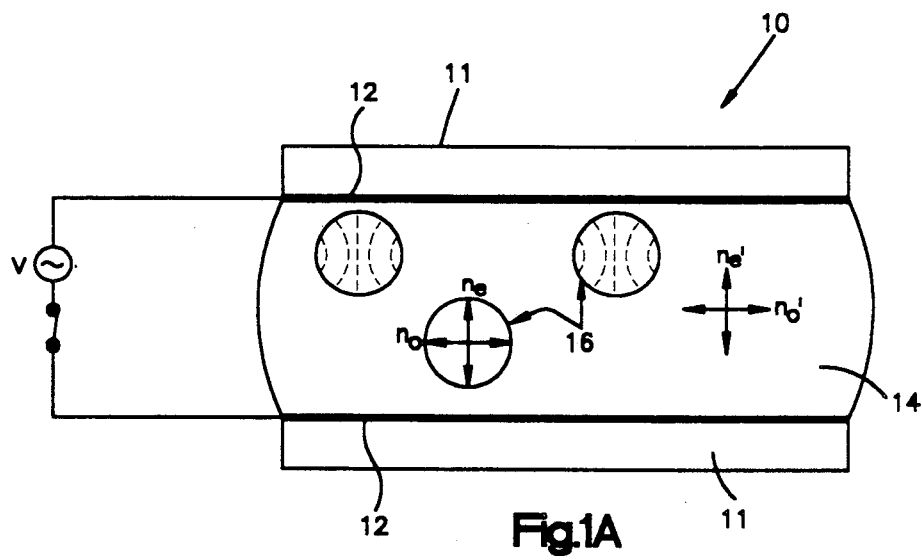
FIGS. 1(A) and 1(B) are diagramatic, fragmentary cross-sectional views of a light shutter device in the ON- and OFF-states, respectively, the device containing a sheet of the light modulating material of the invention depicted with a few representative microdroplets of liquid crystal contained in a liquid crystal polymeric matrix.

In FIG. 1(A), the light modulating shutter device incorporating the new haze-free PDLC material of the invention is generally indicated by reference numeral 10. The device 10 comprises a pair of glass or plastic substrates 11 and a birefringent, polymeric matrix 14 containing phase dispersed microdroplets 16 of liquid crystal. The inner surfaces of the glass substrates 11 have transparent conducting electrode coatings 12 attached to an ac power source of voltage V. In accordance with a preferred embodiment of the invention, the matrix 14 is a polymer having pendant liquid crystal side groups with positive dielectric anisotropy. The ordinary index of refraction, $n_o$, and the extraordinary index of refraction, $n_e$, of the microdroplet 16 are respectively matched to the ordinary index of refraction $n_o'$ and the extraordinary index of refraction $n_e'$ of the birefringent matrix 14.

As also shown in FIG. 1(A), the optical axes of the matrix 14 and the microdroplets 16, which will be understood to lie in the same directions associated with the respective extraordinary indices of refraction, are aligned parallel. Since the optical axes of the microdroplets are parallel to the optical axis of the polymer resin matrix, and since the ordinary and extraordinary indices of refraction of the microdroplets and the matrix are respectively matched, the effective refractive index of the microdroplets is matched to that of the matrix in all directions. Thus, in the ON-state of FIG. 1(A), the device 10 is non-scattering and transmissive to all directions of incident light except for surface reflections from the inner and outer surfaces of the substrates 11.

It is possible to match the refractive indices of the microdroplets with those of the matrix by choosing similar materials for the liquid crystal pendants of the side chain polymer matrix 14 and for the low molecular weight liquid crystal of the microdroplets 16. Cyanobiphenyl materials are preferred when a large positive dielectric anisotropy is desired. It is possible to align the optical axes of the microdroplets and the matrix by application of an electric or magnetic field during fabrication of the device 10. For example, when the matrix 14 is a polymer having liquid crystal side groups with positive dielectric anisotropy, the optical axes of the side groups can be aligned perpendicular to the viewing surface of the device 10 by applying an ac voltage of suitable strength to the conducting electrodes 12 while the polymer liquid crystal is at an elevated temperature in the nematic phase. The homeotropic alignment of the matrix may be made to persist after removal of the ac voltage by treating the surfaces of the substrates 12 in a known manner, or by cooling and operating the device 10 below the glass transition temperature of the aligned polymer liquid crystal, and/or by cross-linking the polymer. Cross-linking can be accomplished by providing the side groups of the polymer with a labile moiety, especially one having a double bond, that is subject to cross-linking with another moiety like itself with ultra violet radiation, thermal radiation, free radical polymerization, or the like.

Figure 1B:
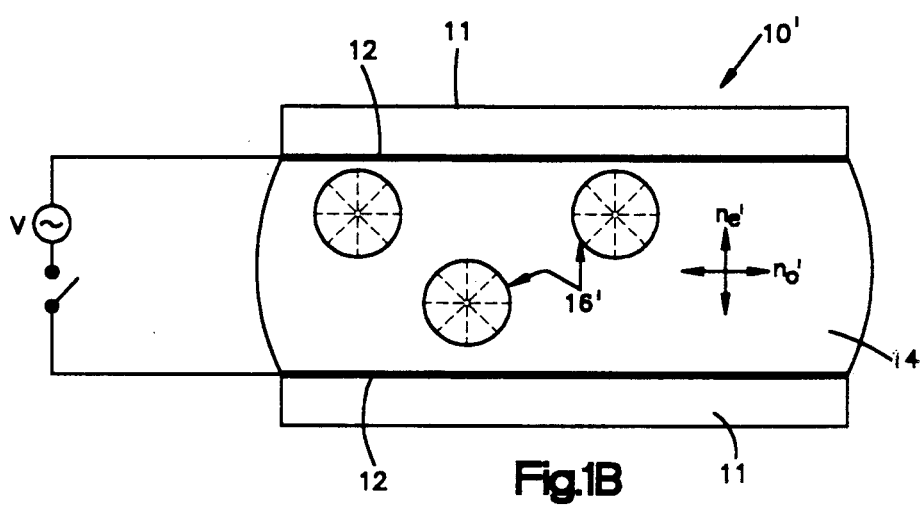

The light shuttering capability of the device 10 in FIG. 1(A) is demonstrated when the power source is disconnected so as to result in the droplet configuration shown in FIG. 1(B). In the device 10' shown in FIG. 1(B), the matrix 14 remains aligned in the OFF-state with its effective refractive index unchanged. The nematic director configuration of the microdroplets 16' is changed, thereby altering the effective refractive index so that it is mismatched from that of the matrix. This mismatch causes light scattering in all directions of incident light. The director configuration of the microdroplets 16' is illustrated in FIG. 1(B) as radial, but it will be understood that the configuration may be any other type which also alters the effective refractive index. For example, if the microdroplets are not spherical in shape, the orientation of the optical axes of the resulting configuration may be altered when the device is switched to the field OFF state, thereby causing the effective refractive index of the microdroplets to be mismatched from that of the matrix.

Figure 2A:
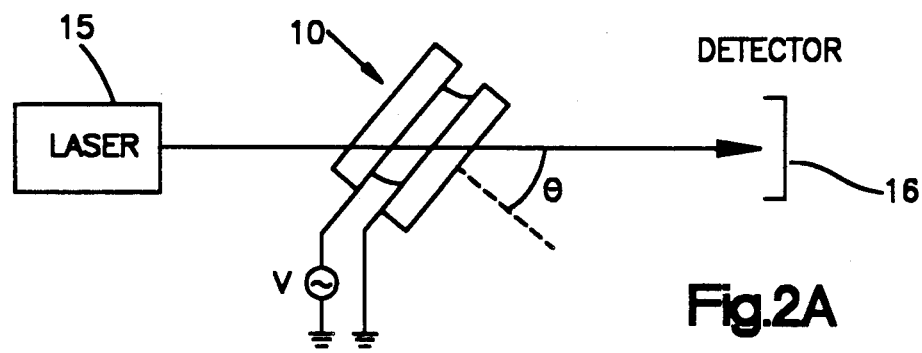
FIG. 2(A) is a diagramatic view of an apparatus for measuring the transparency of a device of FIG. 1A for different directions of incident light.

Referring now to FIG. 2(A), an arrangement is shown for measuring the transparency of a PDLC light shutter device, such as the device 10, for different directions of incident light. A laser 15 is mounted to pass a beam through the device 10 to a detector 16 which measures the percentage of light transmission. The device 10 is mounted so that it can be oriented at different angles theta in the laser beam. The angle of incidence $\theta$ is measured from the normal to the surface of the device 10.

Figure 2B:
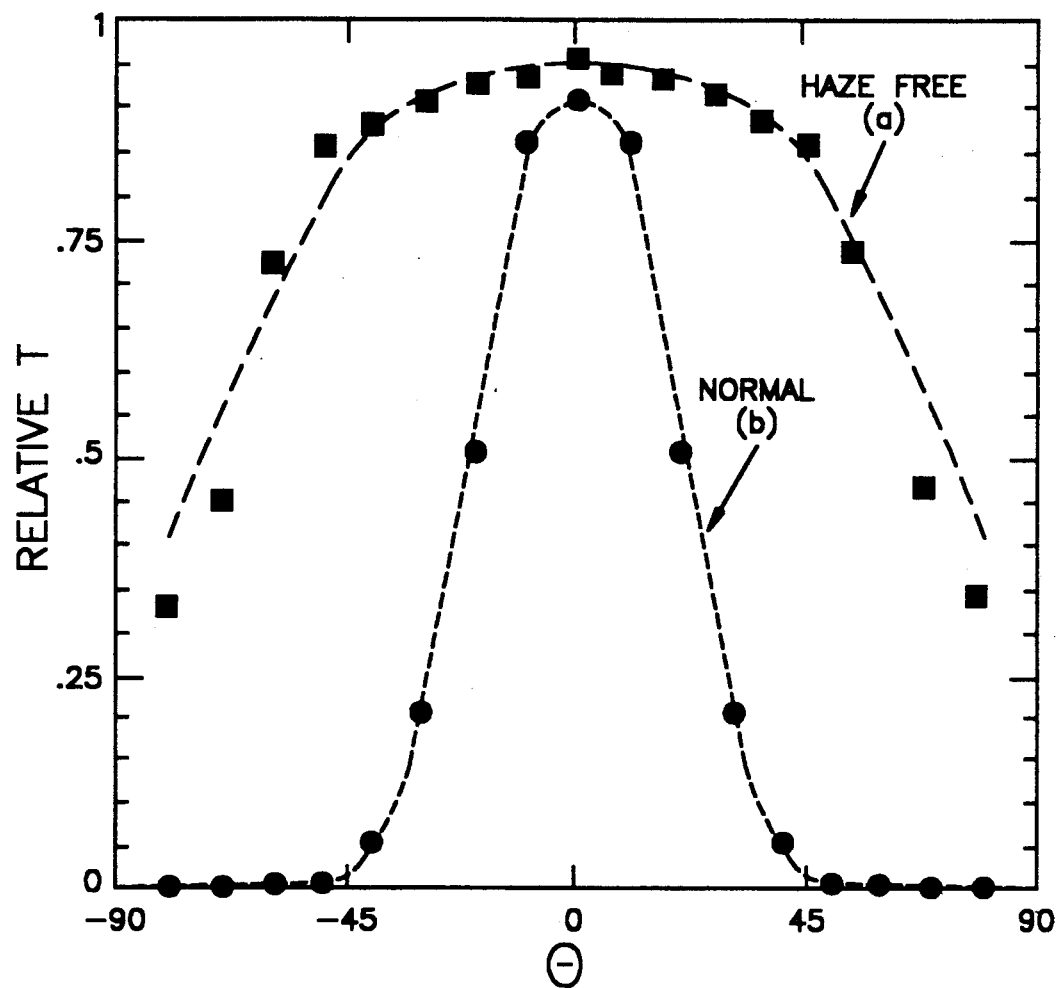
FIG. 2(B) is a graph of light transmission versus angle of incidence for a PDLC light shutter device made according to the invention in the transparent state compared with a similar graph of a PDLC shutter device in the transparent state made with an optically isotropic polymer.

FIG. 2(B) is a graph of transmission T versus angle of incidence $\theta$. The percent transmission was measured as the sample was rotated the indicated number of degrees from normal incidence. Curve (a) is for the PDLC material made according to the invention with an index matched liquid crystal side group epoxy. Curve (b) is for a PDLC material made with an optically isotropic epoxy, as disclosed, for example, in U.S. Pat. Nos. 4,671,618; 4,673,255; 4,685,771; and 4,688,900. The dashed and dotted lines are used to facilitate comparison. Curve (b) shows that the percentage of light transmission through material having an optically isotropic matrix drops sharply a few degrees either side of normal incidence. With the material of the invention, Curve (a), made with a birefingent matrix, light transmission begins to drop sharply about ±60° from the normal due to reflections from the inner and outer surfaces of the glass substrates. Were it not for such reflections, Curve (a) essentially would be a straight line showing no change in light transmission through angles of ±90° from normal incidence.

Figure 3A:
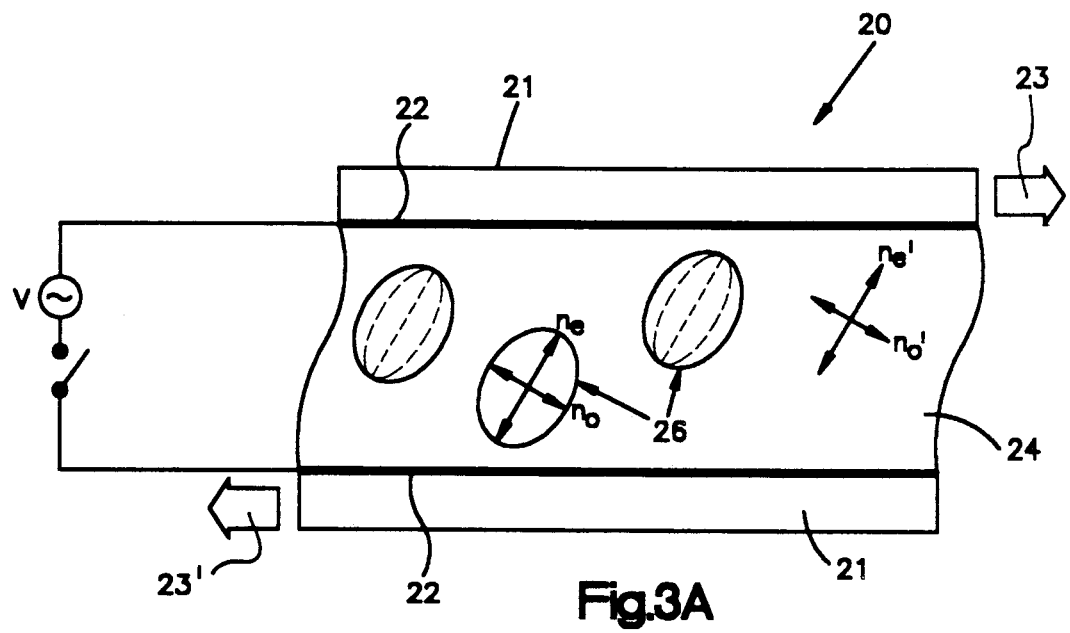
FIGS. 3(A) and 3(B) depict a reverse mode or failsafe light shutter device in which the optical axes of the droplets and the matrix are obliquely aligned by shear stress, the device being shown in the OFF- and ON-states, respectively.

A reverse-mode or fail-safe light modulating shutter device is illustrated in FIG. 3. The field-OFF or transparent state of the light modulating shutter incorporating the new haze-free PDLC material of the invention is generally indicated in FIG. 3(A) by reference numeral 20. The device 20 comprises a pair of glass or plastic substrates 21 coated with transparent electrodes 22 and a birefingent, polymer matrix 24 containing dispersed microdroplets 26 of liquid crystal. In accordance with a preferred embodiment of the invention, the matrix 24 is a polymer liquid crystal which is aligned in an oblique direction relative to the surface normal of the substrates 21 by a shear stress applied as indicated by the arrows 23, 23'. The shearing action also elongates and aligns the liquid crystal microdroplets 26. The ordinary index of refraction, $n_o$, and the extraordinary index of refraction, $n_e$, of the microdroplets 26 are respectively matched to the ordinary index of refraction $n_o'$ and the extraordinary index of refraction $n_e'$ of the birefringent matrix 24. As also shown in FIG. 3(A), the optical axes of the matrix 24 and the microdroplets 26 are aligned parallel. Since the optic axes of the microdroplets are parallel to the optical axis of the polymer resin matrix, and since the ordinary and extraordinary indices of refraction of the microdroplets and the matrix are respectively matched, the effective refractive index of the microdroplets is matched to that of the matrix in all directions. Thus, in the OFF-state of FIG. 3(A), the device 20 is non-scattering and transmissive to all directions of incident light except for surface reflections from the outside and inside of the glass or plastic substrates 21.

It is possible to align the optical axes of the microdroplets with that of the matrix by shear action when the droplets are of the bipolar configuration type as illustrated in FIG. 3(A) by reference numeral 26, but it is to be understood that the configuration may be of any other type in which shearing action of the substrates induces a match of the effective refractive index of the droplets with that of the matrix for all directions of incident light.

It is also understood that materials may exist in which the optical axes of bipolar type droplets may naturally align locally with the local optical axis of the polymer matrix without applying shear stress to the substrates. In such a situation the effective refractive index of the droplets will be matched to the effective refractive index of the birefringent polymer matrix for all directions of incident light so that the resultant material is transparent for all viewing angles irrespective of the direction of alignment of the optical axis relative to normal light incidence.

Figure 3B:
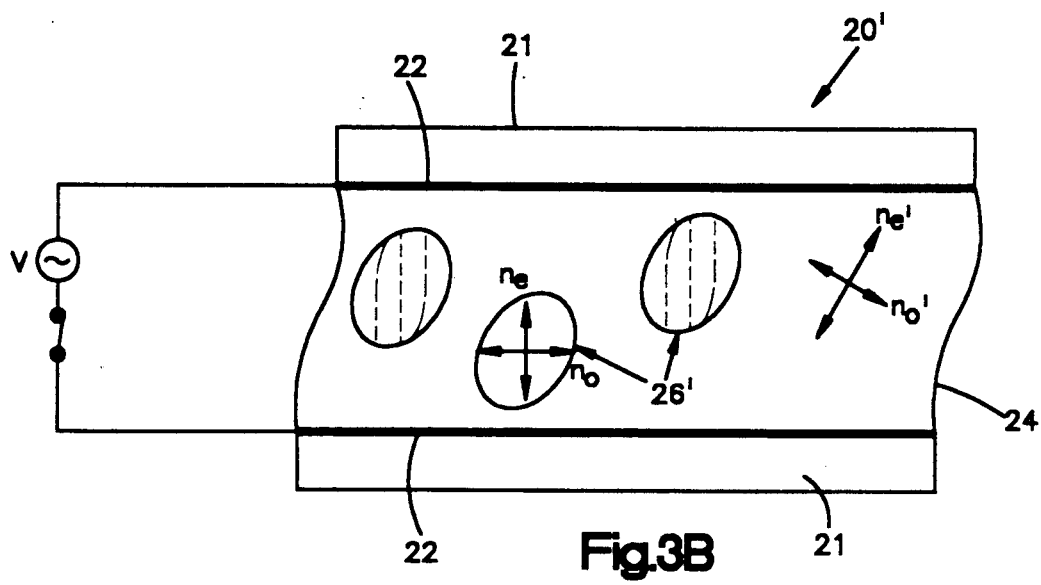

The light shuttering capability of the device 20 in FIG. 3(A) is demonstrated when the power source of voltage V is connected to the transparent conducting electrodes 22 which results in the droplet configuration 26' shown in FIG. 3(B). In the device 20' shown in FIG. 3(B), the matrix 24 remains fixed in orientation in the ON-state with its effective refractive index unchanged. The nematic director configuration of the microdroplets 26' is changed by alignment of their optical axes parallel to the field, thereby altering the effective refractive index so that it is mismatched from that of the matrix. This mismatch causes light scattering in all directions of incident light.

EXAMPLE 1

A liquid crystal epoxy polymer was prepared by mixing an equivalent weight ratio 1:1 of uncured epoxy (MK-107 available from Wilmington Chemicals) with a mesogenic ether-linked curing agent, BP-10, having the formula:

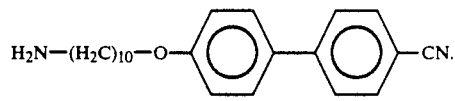

The mixture was heated to above the melting point of the curing agent (110° C.) where a clear homogeneous solution was formed after mixing for about one minute. The solution was then allowed to cure for about 48 hours at a temperature of about 90° C. The cured epoxy liquid crystal polymer was then mixed with low molecular weight liquid crystal (E-7 available from EM Chemicals) in a 1:1 ratio by weight and dissolved in chloroform (approximately 85% by weight chloroform). The solution was mixed for several minutes in a vortex-type mixer and then pipetted in a uniform layer over 26 um spacer on an indium tin oxide conducting electrode-bearing glass substrate. The solvent was then allowed to evaporate at room temperature until the resultant material turned opaque; any remaining solvent was driven off by heating on a hot plate at about 125° C. for five minutes. A preheated conducting electrode-bearing glass substrate was then placed on top of the mixture to form a sandwich and the sample allowed to cool to room temperature in a period of about five minutes. The sample was translucent white in appearance. Application of an ac voltage of 85 V at 60 Hz to the conducting electrodes turned the sample clear or transparent after a few minutes. Use of a polarizing microscope under conoscopic view indicated that the polymer liquid crystal and dispersed liquid crystal droplets were homeotropically aligned under the applied voltage. Removal of the voltage switched the sample opaque white in a time of less than one second. Reapplication of the ac voltage switched the sample clear in a time less than one second. During application of the 85 V potential, the sample remained clear and haze-free even for oblique viewing angles. The angular dependence of light transmission through the sample in its transparent state was measured by directing the light from a helium/neon laser through the sample into a detector which measured the amount of light transmission through the sample as its orientation in the laser beam was varied. The angle between the direction of the laser beam and the normal of the glass substrates was varies between ±85° from normal incidence without any reduction in transmission other than reflection from the glass substrate surfaces (results shown in FIG. 2).

EXAMPLE 2

A liquid crystal epoxy polymer was prepared by mixing equivalent weights of epoxy and ether-linked amine curing agent. To the combined mixture was added low molecular weight liquid crystal in a ratio of 1:1 by weight, and the resultant mixture placed on an indium tin oxide coated glass substrate heated to a temperature above 110° C. where it formed a homogeneous solution. After about 2 minutes of mixing a few 26 um spacers were tapped out onto the solution and a preheated indium tin oxide coated glass substrate mounted on the sample. The sample was cured at 90° C. for 48 hours. The sample was then slowly cooled over a period of about 30 minutes to room temperature. Large nematic droplets of approximately 3-5 um in diameter were observed under a polarizing microscope, and the nematic director configuration of the droplets was observed to be of the radial type.

EXAMPLE 3

Equivalent weights of epoxy resin and amine curing compound were weighed out in a combined 1:1 ratio with low molecular weight liquid crystal on ITO coated glass slides. The entire slide was heated at 115°-120° C. for 1.5 to 3 minutes, with mixing. A preheated ITO glass slide was mounted on each sample, and the samples were annealed at 90° C. for 48 hours.

Under the application of an ac 60 Hz, 85 volt potential, the resultant PDLCs exhibited haze-free wide viewing angles.

Many modifications and variations of the invention will be apparent to those skilled in the art in the light of the foregoing disclosure. Therefore, it is to be understood that, within the scope of the appended claims, the invention can be practiced otherwise than has been specifically shown and described.

We claim:

1. A light modulating liquid crystal material comprising a liquid crystal phase interspersed with a birefringent, light transmissive polymer, the effective indices of refraction of the liquid crystal phase and the polymer being matched for all directions of incident light so that the material is transparent and haze-free in one of a field-ON state or a field-OFF state, and the effective indices of refraction are mismatched for all directions of incident light so that the material is opaque in the other of the field-ON state or field-OFF state.

2. The material of claim 1 wherein the liquid crystal phase has ordinary and extraordinary indices of refraction which are respectively matched to the ordinary and extraordinary indices of refraction of the polymer, the material being transparent and haze-free when the optical axes of the liquid crystal phase and the polymer are aligned and being opaque when the optical axes of the liquid crystal phase and the polymer are not aligned.

3. The material of claim 1 wherein the polymer is a liquid crystal polymer.

4. The material of claim 3 wherein the polymer comprises a liquid-crystal-side-group.

5. The material of claim 1 wherein the polymer comprises a liquid-crystal-side-group polymeric epoxy.

6. The material of claim 4 wherein at least one of the liquid-crystal-side-groups comprises a cyanobiphenyl.

7. The material of claim 1 wherein the liquid crystal phase exhibits a frequency dependent dielectric anisotropy.

8. A light modulating liquid crystal material comprising a first optically birefringent phase dispersed in a second optically birefringent phase, one of said first and second birefringent phases comprising a polymer phase having mesogenic moieties with optical axes aligned relative to a surface of the material, the other of said first and second birefringent phases comprising a liquid crystal phase, and the ordinary and extraordinary indices of refraction of the first and second birefringent phases being matched, whereby the material is transparent and haze-free at all viewing angles when the optical axes of the liquid crystal phase and the mesogenic moieties are aligned, and the material is opaque when the optical axes of the liquid crystal phase and the mesogenic moieties are unaligned.

9. The material of claim 8 wherein the second birefringent phase consists essentially of a liquid-crystal-side-group polymer and the first birefringent phase consists essentially of a liquid crystal.

10. The material of claim 9 wherein the liquid-crystal-side-group polymer comprises liquid-crystal-side-groups having a labile moiety capable of cross-linking with another moiety identical to itself.

11. The material of claim 10 wherein the moieties are cross-linked to permanently align the liquid-crystal-side-groups.

12. A fail-safe, light modulating liquid crystal material comprising microdroplets of liquid crystal exhibiting negative dielectric anisotropy dispersed in a light transmissive, liquid-crystal-side-group polymeric synthetic resin matrix, the ordinary and extraordinary indices of refraction of the microdroplets being respectively matched to the ordinary and extraordinary refractive indices of the matrix, the liquid-crystal-side-groups exhibiting positive dielectric anisotropy, and the optical axes of the matrix and microdroplets being perpendicular to a viewing surface of the material, whereby the material is transparent in the absence of an applied field and is opaque in the presence of an applied field.

13. A fail-safe, light modulating liquid crystal material comprising a light transmissive, liquid crystal polymeric synthetic resin matrix containing microdroplets of liquid crystal, the ordinary and extraordinary indices of refraction of the microdroplets and the matrix being respectively matched, and the optical axes of the microdroplets and matrix being aligned parallel in a direction oblique to the viewing angle of incident light, and the microdroplets being responsive to an applied field to misalign the optical axes of the microdroplets and whereby the material is opaque in the ON-state.

14. A light modulating liquid crystal material comprising discrete quantities of liquid crystal contained in a birefringent solid, the discrete quantities of liquid crystal having ordinary and extraordinary indices of refraction which are respectively matched to ordinary and extraordinary indices of refraction of the matrix so that the material is light-transmissive when the optical axes of the microdroplets and matrix are aligned.

15. A material according to claim 1 wherein the polymer comprises a polymer matrix and the liquid crystal phase comprises microdroplets of liquid crystal dispersed in the polymer matrix.

16. A material according to claim 8 wherein the first birefringent phase is the liquid crystal phase and the second birefringent phase is the polymer phase.

17. A light modulating liquid crystal material comprising a first optically birefringent phase dispersed in a second optically birefringent phase, one of said first and second birefringent phases comprising a polymer phase having mesogenic moieties and the other of said first and second birefringent phases comprising a liquid crystal phase;

ordinary and extraordinary indices of refraction of the liquid crystal phase and the mesogenic moieties being matched;

optical axes of the liquid crystal phase and the mesogenic moieties being aligned in the absence of an electric or magnetic field so that the effective indices of refraction of the liquid crystal phase and the mesogenic moieties for all directions of incident light are matched; and said liquid crystal phase being responsive to an applied electric or magnetic field to reorient the optical axis of the liquid crystal out of alignment with the optical axis of the liquid crystalline polymer phase so that the material is less light transmissive in a field-on state than in a field-off state.

* * * * *